United States Patent
Merchant et al.

(10) Patent No.: US 9,104,482 B2
(45) Date of Patent: Aug. 11, 2015

(54) DIFFERENTIATED STORAGE QOS

(75) Inventors: Arif A. Merchant, Los Altos, CA (US); Mustafa Uysal, Fremont, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1010 days.

(21) Appl. No.: 12/636,526

(22) Filed: Dec. 11, 2009

(65) Prior Publication Data
US 2011/0145449 A1    Jun. 16, 2011

(51) Int. Cl.
G06F 3/00 (2006.01)
G06F 15/173 (2006.01)
G06F 11/00 (2006.01)
G06F 9/50 (2006.01)

(52) U.S. Cl.
CPC ............ G06F 9/5011 (2013.01); G06F 11/008 (2013.01)

(58) Field of Classification Search
None
See application file for complete search history.

(56) References Cited

U.S. PATENT DOCUMENTS

| | | | |
|---|---|---|---|
| 6,724,727 B2* | 4/2004 | Counterman | 370/235 |
| 7,145,871 B2* | 12/2006 | Levy et al. | 370/229 |
| 7,386,632 B1* | 6/2008 | Sitaraman et al. | 709/242 |
| 8,732,310 B2* | 5/2014 | Breitgand et al. | 709/226 |
| 2002/0114274 A1* | 8/2002 | Sturges et al. | 370/229 |
| 2002/0143911 A1* | 10/2002 | Vicente et al. | 709/223 |
| 2002/0152305 A1* | 10/2002 | Jackson et al. | 709/224 |
| 2002/0154645 A1* | 10/2002 | Hu et al. | 370/401 |
| 2004/0003087 A1* | 1/2004 | Chambliss et al. | 709/226 |
| 2004/0213273 A1* | 10/2004 | Ma | 370/401 |
| 2005/0033878 A1* | 2/2005 | Pangal et al. | 710/36 |
| 2005/0071599 A1* | 3/2005 | Modha et al. | 711/170 |
| 2006/0092963 A1* | 5/2006 | Bakre et al. | 370/437 |
| 2007/0067794 A1* | 3/2007 | Russell et al. | 725/25 |
| 2008/0049615 A1* | 2/2008 | Bugenhagen | 370/230.1 |
| 2008/0075101 A1* | 3/2008 | Illikkal et al. | 370/412 |
| 2008/0168523 A1* | 7/2008 | Ansari et al. | 725/131 |
| 2010/0020756 A1* | 1/2010 | Kennedy | 370/329 |

OTHER PUBLICATIONS

Wei Jin, et al. Interposed Proportional Sharing for a Storage Service Utility. pp. 37-48. Jun. 2004.
J. Zhang, et al. Storage Performance Virtualization via Throughput and Latency Control. pp. 135-142. Sep. 2005.
Shenoy, et al. Cello: A Disk Scheduling Framework for Next Generation Operation Systems. pp. 44-55. Jun. 1998.
Gulati, et al. pClock: An arrival curve based approach for QoS in shared storage systems. pp. 13-24. Jun. 2007.
Gulati, et al. Efficient and adaptive proportional share I/O scheduling. HP Labs. Nov. 2007.
Wong, et al. Zygaria: Storage performance as managed resource. pp. 125-134. Apr. 2006.

(Continued)

*Primary Examiner* — Michael Sun
(74) *Attorney, Agent, or Firm* — Hewlett-Packard Patent Department

(57) ABSTRACT

A system includes disk storage to provide differentiated storage QoS for a plurality of IO classes. Each IO class has a plurality of applications to it. A QoS controller collects IO statistics for each application and each class. The QoS controller adaptively determines an IO class assignment for each application based at least in part on the collected IO statistics.

19 Claims, 4 Drawing Sheets

(56) References Cited

OTHER PUBLICATIONS

Wu, et al. The design and implementation of AQuA: An adaptve quality of service aware object-based storage device. In proceedings of IEEE/NASA Goddard Conference on mass storage.

Karlsson, et al. Triage: Performance differentiation for storage systems using adaptive control. pp. 457-480. 2005.

Wachs, et al. Argon: Performance insulation for shared storage servers. pp. 5-5. 2007.

Chambliss, et al. Performance virtualization for large-scale storage systems. pp. 109-118. Oct. 2003.

Lumb, et al. Facade: Virtual storage devices with performance guarantees. pp. 131-144. Mar. 2003.

Padala et al. Automated Control of Multiple Resources. In the proceedings of the EuroSys 2009.

* cited by examiner

DIFFERENTIATED STORAGE QOS

BACKGROUND

Large disk arrays and other storage systems often store data for many applications and users. Certain stored data may be considered higher priority data than other stored data. Storage quality of service (QoS) attempts to prioritize input/output (IO) requests for stored data and guarantee a particular service quality (e.g., throughput, latency, etc.) in view of various rules, constraints, and/or requirements.

BRIEF DESCRIPTION OF DRAWINGS

The following description includes discussion of figures having illustrations given by way of example of implementations of embodiments of the invention.

DETAILED DESCRIPTION

As provided herein, various methods and systems facilitate differentiated QoS for storage systems, such as disk arrays and the like. When applications share a disk storage or other storage system, it is desirable to have the ability to specify the QoS requirements of each application (e.g., throughput, latency, etc.). Additionally, it is desirable to ensure that each application receives its QoS requirement.

In many storage systems, the ability to provide QoS is limited to a small number of applications. When there are more applications than the system is designed to handle (with respect to QoS for IO requests), applications can be aggregated into a single application class that is treated as a single application with respect to QoS by the storage system. However, in certain situations—especially in the case of applications with throughput requirements—aggregating applications into a single class may result in a system giving the application class its combined required throughput while individual applications within the class receive more or less than their individual throughput requirement. For example, when ten applications—each with a throughput requirement of 1,000 IO requests per second—are combined into an application class with an aggregate throughput of 10,000 IO requests per second, it is possible that half of the applications will receive 1,500 IO requests per second of throughput while the other half receives only 500 IO requests per second of throughput. In this example, the total throughput satisfies the 10,000 IO requests per second requirement, but misses the requirements for half the applications and exceeds the requirements for the other half.

Various embodiments described herein include a storage system that provides QoS for a small number of application classes with latency bounds, and a control system that moves applications between these classes as needed to achieve either latency or throughput requirements. Accordingly, differentiated storage QoS can be used in systems with a relatively large numbers of applications.

Figure 1:
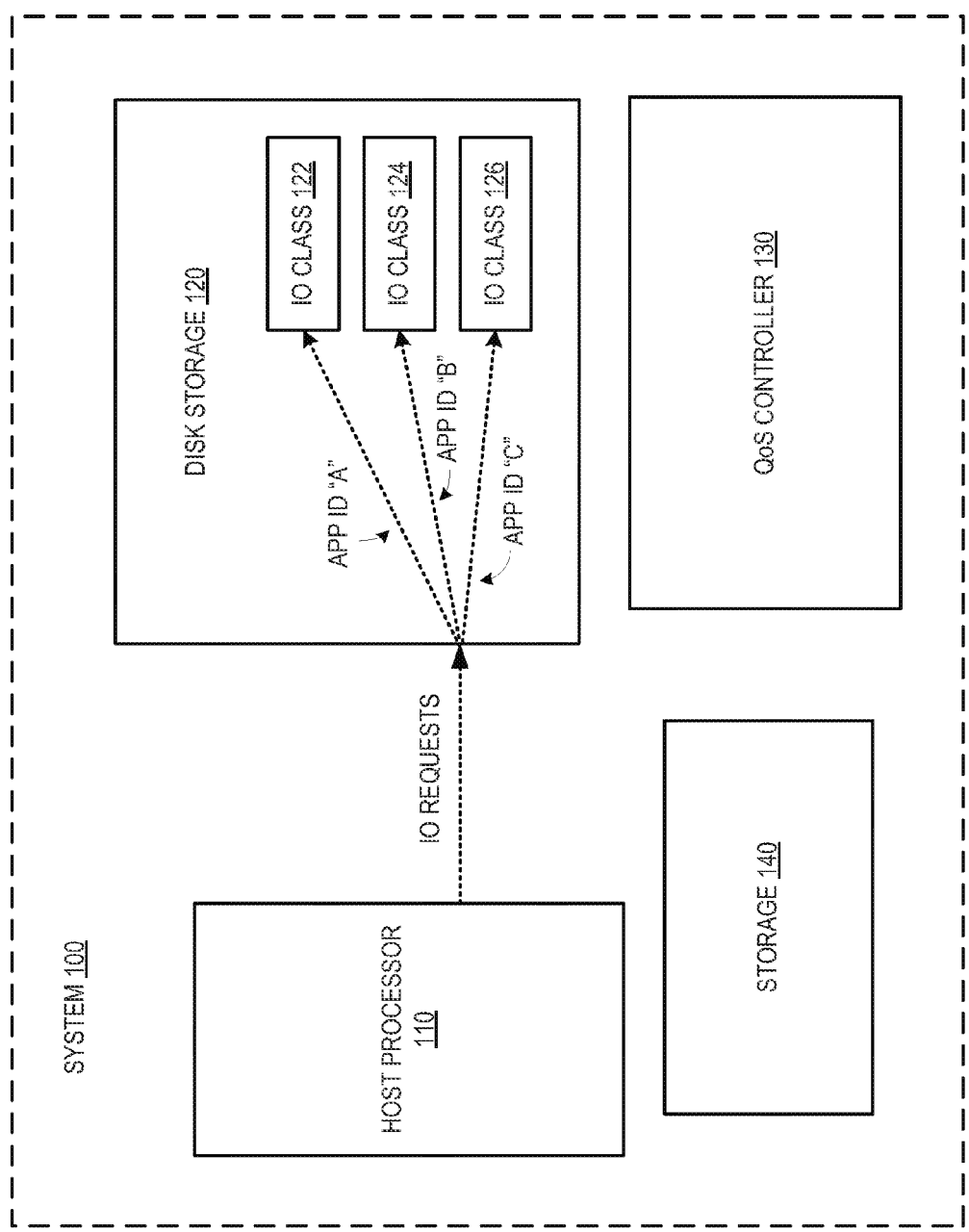
FIG. 1 is a block diagram illustrating a system according to various embodiments.

FIG. 1 is a block diagram illustrating a system according to various embodiments. As shown, system 100 includes a host processor 110, disk storage 120, and a QoS controller 130. QoS controller 130 can be internal or external to system 100 in different embodiments. Disk storage 120 (e.g., a disk array) supports a limited number of input/output (IO) classes. As used in this context, the term "limited" refers to the limited differentiation of applications and/or classes in providing QoS for the storage system. Also, relative terms such as "small" and "large", as used herein to describe the relative numbers of applications and/or IO classes, are intended to illustrate situations where the number of applications requesting QoS service is greater than the number of differentiated slots available in the system for QoS processing.

IO requests from host 110 are tagged with an application identifier (ID) and are assigned to an IO class, for example, upon arrival at disk storage 120. The assignment of application ID to an IO class may be performed at host 110, disk storage 120, or anywhere in between them in different embodiments, based on a translation table provided and periodically updated by QoS controller 130. An IO class, as used herein, refers to a logical grouping of applications for at least the purpose of providing QoS to the class as a whole. An application ID, as used herein, can be any tag or identifier that is used to associate an IO request with a particular application.

As shown in FIG. 1, each IO request is adaptively assigned to one of IO classes 122, 124, or 126. Each of classes 122, 124, and 126 may be assigned IO requests from multiple different applications. As processing conditions, priorities, etc. change, application IDs for Application "A", for example, could be reassigned from class 122 to class 124. Similarly, IO requests originating from Applications "B" or "C" can be reassigned to different classes depending on current processing conditions, priorities, etc. The adaptive determining of class assignments is performed by controller 130.

In various embodiments, disk storage 120 provides differentiated storage QoS for application-originated IO requests according to IO class. QoS controller 130 collects QoS statistics for each application that dispatches IO requests to disk storage 120. QoS controller 130 also collects QoS statistics for each IO class. For example, disk storage 120 might measure throughput, latency, and/or queuing delay for each application and application class.

In view of the collected IO statistics, QoS controller 130 adaptively determines IO class assignments for each application. The term "adaptively", as used in the context of determining IO class assignments, refers to class assignments that are dynamic and subject to automatic change based on conditions detected by system 100. For example, an application may originally be assigned to a first IO class based on some QoS requirement for the application. However, after collecting IO statistics for some period of time, QoS controller 130 might adaptively determine that the application's QoS requirement is not being satisfied and thus reassign the application to a different IO class. In this way, system 100 is able to adaptively achieve application-level QoS granularity within a class-level QoS framework.

Figure 2:
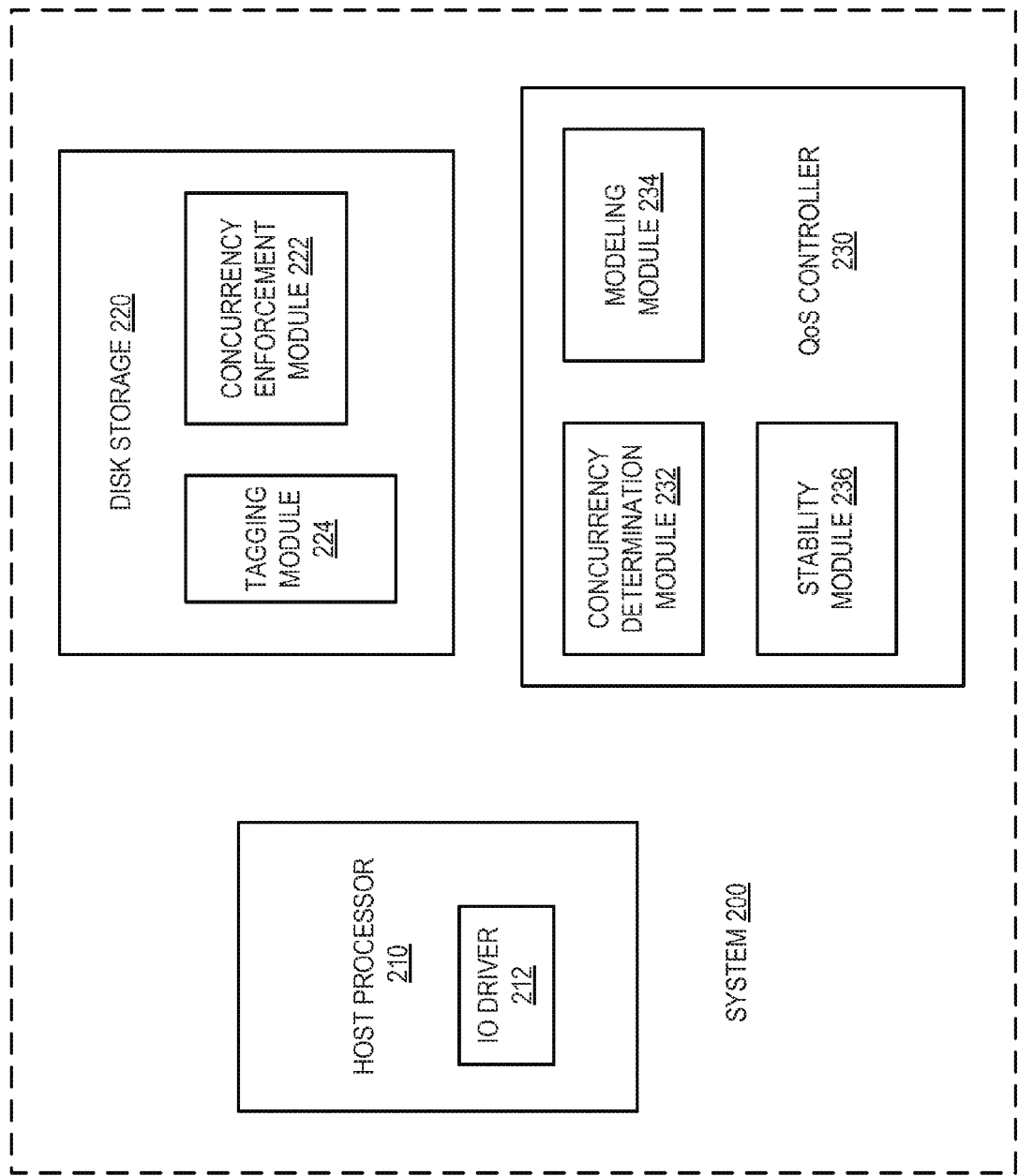
FIG. 2 is a block diagram illustrating a system according to various embodiments.

FIG. 2 is another block diagram illustrating a system according to various embodiments. System 200 includes a host processor 210, a disk storage 220 and a QoS controller 230. Similar to the QoS controller of FIG. 1, QoS controller 230 may be internal or external to system 200 in different embodiments.

Concurrency enforcement module 222 manages scheduling and/or dispatching of IO requests for IO classes supported by disk storage 220. In particular, concurrency enforcement module 222 enforces an upper limit on the number of IO requests allowed to be pending form each class (i.e., IO requests that have been dispatched to disk storage 220 for service, but not completed). This upper limit is referred to herein as the concurrency limit, or simply concurrency, for the class. A higher concurrency limit corresponds to a higher resource allocation for that class (i.e., more IO requests allowed to be pending).

In various embodiments, controller 230 periodically adjusts the concurrency limits for each class to maintain the queuing delays within the limits for each class. For example, if there are 32 IO classes, the target queuing delay limits might be 1 millisecond (ms), 2 ms, 4, ms, 8 ms, 12 ms, etc. Other suitable numbers of IO classes and/or target queuing delay limits may be used in alternate embodiments. In certain embodiments, these values are fixed values, set by an administrator or by the designer of controller 230. The target queuing delay limits could be dynamic values in different embodiments.

Stability module 236 may limit the adjustment of an application's IO class by a single priority and/or class level at a time. In particular, concurrency determination module 232 obtains statistics regarding the IO requests from each application. The IO statistics may include, but are not limited to, the number of IO requests dispatched and/or received, the number of IO requests completed, and/or the mean latency of the completed IO requests. In certain embodiments, such statistics may be obtained from, for example, IO driver 212 on host 210. Controller 230 could also measure the statistics in some embodiments.

Concurrency determination module 232 further obtains statistics regarding each IO class from disk storage 220. Such statistics may include, but are not limited to, the number of IO requests dispatched and/or received, the number of IO requests completed, the number of IO requests queued, and/or the mean queuing delay for each IO request.

Modeling module 234 computes two models in various embodiments, though more models or fewer models could be generated in different embodiments. The first model computed by modeling module 234 relates the value of an application's target QoS metric to the queuing delay for the application's IO requests. If, for example, the application's target metric is throughput, the model relates the application's throughput to the queuing delay experienced by the application's IO requests. The model could be a theoretical model, a model using linear regression based on recent statistical measurements, or some combination of these. For a new application (i.e., one with no statistical history), a default model, for example, based on an average of existing applications statistics, might be used. Other types of default models could be used in different embodiments. As the application is run, modeling module 234 continuously evolves the default model based on the observed performance metrics in the recent past.

The second model computed by modeling module 234 estimates a concurrency level needed for an application if assigned to a particular IO class in disk storage 220. In other words, modeling module 234 derives a formula to estimate by how much the concurrency limit of an IO class needs to be increased (or decreased) if the application is assigned to that particular IO class. Similar to the first model, a default model may be used when a new application is being modeled.

Modeling module 234 provides the models to concurrency determination module 232 to determine the aggregate concurrency needed to meet all of the applications' ideal class assignments. If the aggregate concurrency is less than the total available concurrency, concurrency determination module 232 assigns each application to its ideal IO class. As each application is assigned to an IO class, the concurrency of the IO class is incremented accordingly.

In various embodiments, concurrency leftover or remaining after all applications have been assigned to an IO class may be distributed among the IO classes. For example, the remaining concurrency could be distributed in proportion to the concurrency already given to each application. Other suitable forms of distribution could also be used.

If concurrency module 232 determines that the aggregate concurrency exceeds the total available concurrency for the storage system, then the concurrency requirements for certain applications are degraded in various embodiments. In other words, if there is not enough available concurrency to fulfill all of the IO demands for the storage system, certain applications will receive less concurrency than was requested. In this situation, modeling module 234 combines the two previously generated models for each application to find an assignment that does not exceed the total available concurrency. Combining models may be accomplished using a mathematical optimization program that includes, for example, mixed integer programming (MIP), linear programming, and/or special purpose combinatorial optimization.

Based on the mathematical optimization of modeling module 234, concurrency determination module 232 degrades the performance of certain applications (e.g., by moving the application(s) to a lower priority IO class). In certain embodiments, performance is degraded in inverse proportion to its priority level as far as possible within the concurrency constraints. Additional constraints could also be applied in different embodiments, such as limiting IO class movement to one priority level for each application.

Tagging module 224 receives IO class assignments from controller 230 and tags IO requests from the various applications according to the IO class assignments. While tagging module 224 is shown as part of disk storage 220, tagging module 224 could be located on host 210 or between host 210 and disk storage 220 in alternate embodiments.

It should also be noted that the various modules shown in FIG. 2 can be implemented in various embodiments as one or more software modules, hardware modules, special-purpose hardware (e.g., application specific hardware, application specific integrated circuits (ASICs), embedded controllers, hardwired circuitry, etc.), or some combination of these.

Figure 3:
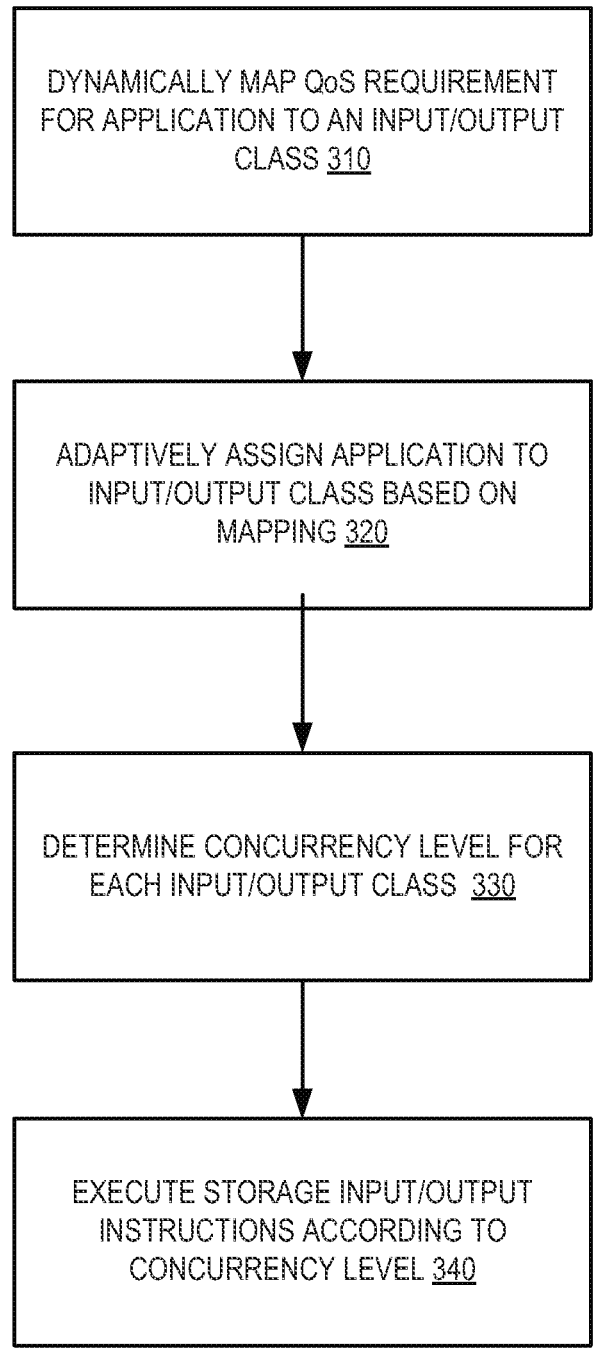
FIG. 3 is a flow diagram of operation in a system according to various embodiments.

FIG. 3 is a flow diagram of operation in a system according to various embodiments. A storage system dynamically maps 310 a QoS requirement for an application to an input/output (IO) class. The QoS requirement for an application could be a throughput requirement, a latency requirement or other suitable QoS requirement in different embodiments. For example, the storage system may be capable of providing QoS for various IO classes where the IO classes are organized by IO request priority. Thus, IO requests with the highest priority may be mapped to a highest priority IO class in various embodiments. Based on changing resource demands, IO request volume, etc., the mapping for each application may be dynamically updated (e.g., on a periodic basis) to account for the changing system conditions.

Based on the dynamic mapping, the storage system adaptively assigns 320 the application to an IO class. The IO class assignment is adaptive for at least the reason that the IO class assignment is automatically reevaluated over time (e.g., periodically) in various embodiments and may be changed if an existing class assignment does not result in an application's QoS requirement being satisfied.

The storage system determines 330 a concurrency level necessary to achieve a desired QoS metric (e.g., latency, throughput, etc.) for each IO class. As discussed above, IO class concurrency refers to the number of IO requests allowed to be pending for each IO class. As such, a higher concurrency limit corresponds to a higher resource allocation for that particular class.

Based on the concurrency level for each IO class, the storage system executes 340 storage IO instructions (corresponding to application-originated IO requests) for certain applications.

Figure 4:
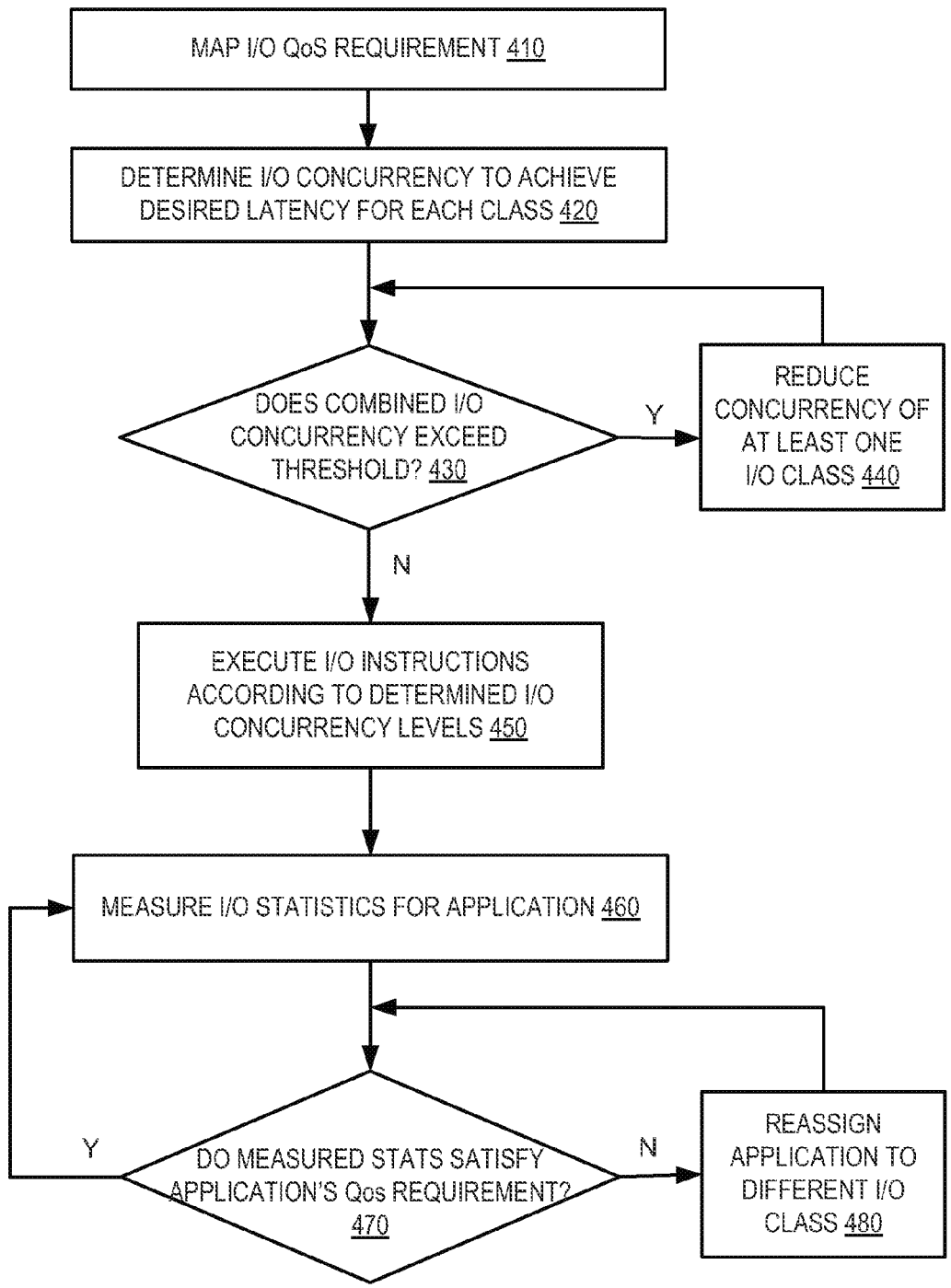
FIG. 4 is a flow diagram of operation in a system according to various embodiments.

FIG. 4 is another flow diagram of operation in a system according to various embodiments. A storage system maps 410 an input/output (IO) quality of service (QoS) requirement for certain applications to one of multiple IO classes. The QoS mapping occurs dynamically in various embodiments. In certain embodiments, the mapping is driven by application priority, although other suitable factors could be used.

In various embodiments, the QoS provided to the IO classes is latency-based. Other suitable QoS factors could be used separately or in combination in alternate embodiments. Thus, in a priority-driven mapping scheme, applications may be mapped to an IO class based on a latency bound for each application. In other words, each application may be assigned to an IO class having a latency bound which translates to the application's QoS requirement. For example, the latency bound of an IO class assignment could be translated to fulfill a throughput requirement of an application.

A QoS controller tied to the storage system (e.g., either internally or externally) determines 450 the total and/or combined concurrency needed to achieve the desired latency for each IO class based on the application assignments to the various IO classes.

If the controller determines 460 that the total and/or combined concurrency needed to achieve the desired latency for each IO class exceeds the threshold of available concurrency for the system, then the concurrency of at least on IO class is reduced 470. In various embodiments, the concurrency of an IO class might be reduced by reassigning an application (and its associated concurrency demand) to a different (e.g., lower priority) IO class. In other embodiments, concurrency within certain classes might be degraded. For example, if the total available concurrency is insufficient for the concurrency demands of each IO class, some or all of the IO classes might be forced to operate with less than the desired concurrency, meaning that applications within the class will receive less their desired QoS.

Once the application class assignments and class concurrency allocations satisfy the available concurrency threshold, the storage system executes 480 IO instructions (corresponding to various IO requests) according to the determined concurrency levels for each IO class.

During execution, the controller measures 420 QoS (e.g., latency, throughput, etc.) for each application. If the controller determines 430 that the measured QoS for an application is insufficient, then the controller assigns 440 the application to a different IO class. In some embodiments, the controller may be limited to adjusting an application's IO class by a single priority level at a time. In other embodiments, reassigning an application to a different IO class may trigger the controller to reevaluate concurrency distribution among the IO classes. If the controller determines 430 that the measured QoS for the application is sufficient, it continues to monitor and measure 420 IO statistics for each application.

Elements of described embodiments, including the methods described with respect to FIGS. 3-4, may also be provided as a computer-readable storage medium for storing computer-executable instructions. Such instructions could be maintained, for example, in storage 140 and executed by processor 110, as shown in FIG. 1. Various components described herein may be a means for performing the functions described herein.

The invention claimed is:

1. A storage system, comprising:
    disk storage to provide differentiated storage quality of service (QoS) for a plurality of input/output (IO) classes, each class having a plurality of applications assigned to it;
    a QoS controller to collect IO statistics for each application and each class; and
    the QoS controller to adaptively determine an IO class assignment for each application based at least in part on the collected IO statistics to adaptively achieve application-level QoS granularity within a class-level QoS framework.

2. The storage system of claim 1, wherein the disk storage further comprises:
    a concurrency enforcement module to enforce a concurrency level for outstanding IO requests in each class.

3. The storage system of claim 2, wherein the QoS controller further comprises:
    a concurrency determination module to dynamically determine a concurrency level necessary to maintain a desired quality of service for each class.

4. The storage system of claim 3, wherein the concurrency determination module further comprises:
    at least a linear regression module or a theoretical queuing module to model a relationship between a priority of an application and the desired quality of service in view of an IO class assignment.

5. The storage system of claim 1, further comprising:
    a tagging module to tag IO requests from an application with a class identifier (ID) according to the determined class assignment for the application.

6. The storage system of claim 1, wherein the desired quality of service includes at least one of a desired queuing delay or a desired latency.

7. The storage system of claim 1, wherein the QoS controller further comprises:
    a stability module to limit concurrency allocation changes per control cycle.

8. A method, comprising:
    dynamically mapping a storage input-output (IO) QoS requirement for an application to one of multiple latency-based IO classes;
    adaptively assigning the application to an IO class based on the mapping;
    determining an IO concurrency level necessary to achieve a desired QoS for each IO class;
    and executing storage IO instructions for the application according to the determined concurrency level for the IO class to which the application is assigned to adaptively achieve application-level QoS granularity within a class-level QoS framework.

9. The method of claim 8, further comprising:
    determining that a combined IO concurrency level for multiple IO classes exceeds a total concurrency threshold for a system; and
    reducing the concurrency level of at least one IO class.

10. The method of claim 9, wherein the reducing of the concurrency level is performed on a proportional basis for each application assigned to the at least one IO class.

11. The method of claim 9, wherein the reducing of the concurrency level of at least one class further comprises:
    reassigning an application from the at least one IO class to a different IO class based on a priority of the application.

12. The method of claim 9, wherein reducing the concurrency level further comprises:
reassigning at least one application to a different IO class.

13. The method of claim 8, wherein adaptively assigning the application to an IO class comprises:
dynamically measuring actual IO throughput for the application;
determining that the actual IO throughput for the application is insufficient; and
reassigning the application to a different IO class.

14. A non-transitory computer-readable storage medium containing instructions that, when executed, cause a computer to:
aggregate multiple host applications into a single storage input/output (IO) class; and
adaptively provide differentiated storage QoS control per application where disk storage handles differentiated IO scheduling per class to adaptively achieve application-level QoS granularity within a class-level QoS framework.

15. The non-transitory computer-readable storage medium of claim 14, wherein the instructions that cause the adaptive providing of differentiated storage QoS comprise further instructions that cause the computer to:
tag input/output (IO) requests received from a host with an application identifier (ID);
map the application ID to an IO class; and
assign the tagged IO requests to the IO class to which the application ID is mapped.

16. The non-transitory computer-readable storage medium of claim 15, wherein the mapping is based on at least one of an application priority or an application throughput requirement.

17. The non-transitory computer-readable storage medium of claim 15, wherein the instructions that cause the computer to map the application ID to an IO class comprises further instructions that cause the computer to:
build an application model for an application based on collected IO statistics, the model relating application priority and desired quality of service of IO requests;
build a concurrency model based on collected IO statistics to estimate concurrency demand associated with the application if assigned to a particular IO class; and
generate a class assignment for the application based at least in part on the models.

18. The non-transitory computer-readable storage medium of claim 17, comprising further instructions that cause the computer to:
determine whether a total concurrency threshold is satisfied in response to the generated class assignment; and
reduce the concurrency level of at least one IO class if the total concurrency threshold is not satisfied.

19. The non-transitory computer-readable storage medium of claim 18, wherein the instructions that cause the computer to reduce the concurrency level of at least one IO class comprise further instructions that cause the computer to:
degrade application performance in inverse proportion to a priority of the application.

* * * * *